(12) United States Patent
Friesen et al.

(10) Patent No.: US 9,248,584 B2
(45) Date of Patent: *Feb. 2, 2016

(54) HIGH-TEMPERATURE SPRAY DRYING PROCESS AND APPARATUS

(75) Inventors: Dwayne T. Friesen, Bend, OR (US);
David D. Newbold, Bend, OR (US);
John M. Baumann, Bend, OR (US);
Devon B. DuBose, Bend, OR (US);
Douglas L. Millard, Bend, OR (US)

(73) Assignee: Bend Research, Inc., Bend, OR (US)

( * ) Notice: Subject to any disclaimer, the term of this patent is extended or adjusted under 35 U.S.C. 154(b) by 87 days.

This patent is subject to a terminal disclaimer.

(21) Appl. No.: 13/825,770

(22) PCT Filed: Sep. 22, 2011

(86) PCT No.: PCT/US2011/052819
§ 371 (c)(1),
(2), (4) Date: Mar. 22, 2013

(87) PCT Pub. No.: WO2012/040502
PCT Pub. Date: Mar. 29, 2012

(65) Prior Publication Data
US 2013/0193598 A1    Aug. 1, 2013

Related U.S. Application Data

(60) Provisional application No. 61/386,384, filed on Sep. 24, 2010.

(51) Int. Cl.
*B01J 2/04* (2006.01)
*B29B 9/00* (2006.01)

(52) U.S. Cl.
CPC ..... *B29B 9/00* (2013.01); *B01J 2/04* (2013.01)

(58) Field of Classification Search
CPC ................................. B01J 2/04; B29B 9/00
See application file for complete search history.

(56) References Cited

U.S. PATENT DOCUMENTS

| 2,460,546 A | 1/1949 | Stephanoff |
| 2,937,091 A | 5/1960 | Rosenberg |

(Continued)

FOREIGN PATENT DOCUMENTS

| DE | 3229843 | 3/1983 |
| EP | 0113967 | 7/1984 |

(Continued)

OTHER PUBLICATIONS

Grenha et al., "Microencapsulated chitosan nanoparticles for lung protein delivery," *European Journal of Pharmaceutical Sciences*, vol. 25, Issues 4-5, pp. 427-437 (Jul.-Aug. 2005).

(Continued)

*Primary Examiner* — Ernst V Arnold
*Assistant Examiner* — Kyung Sook Chang
(74) *Attorney, Agent, or Firm* — Klarquist Sparkman, LLP (57) ABSTRACT

The process comprises delivering a spray solution comprising at least one solute in a solvent to a spray-drying apparatus, using a flash nozzle to atomize the spray solution into droplets within the spray-drying apparatus to remove at least a portion of the solvent from the droplets to form a plurality of particles, and collecting the particles. The spray solution is directed to a heat exchanger, thereby increasing the temperature of the spray solution to a temperature $T_2$, wherein $T_2$ is greater than $T_1$. The flash nozzle comprises a central tube through which the spray solution is delivered and an outer tube through which a sweep gas is delivered. The central tube may have a first outer diameter at an inlet and a second outer diameter at an outlet, wherein the first outer diameter is greater than the second outer diameter.

15 Claims, 3 Drawing Sheets

(56) References Cited

U.S. PATENT DOCUMENTS

| | | |
|---|---|---|
| 3,557,864 A | 1/1971 | Berg |
| 3,621,902 A | 11/1971 | Okada et al. |
| 3,673,106 A | 6/1972 | Jonas et al. |
| 3,922,189 A | 11/1975 | Penders |
| 4,019,958 A | 4/1977 | Hell et al. |
| 4,089,120 A | 5/1978 | Kozischek |
| 4,201,756 A | 5/1980 | Saeman et al. |
| 4,209,912 A | 7/1980 | Barker |
| 4,380,491 A | 4/1983 | Joy et al. |
| 5,013,557 A | 5/1991 | Tai |
| 5,039,532 A | 8/1991 | Jost et al. |
| 5,135,611 A | 8/1992 | Cameron |
| 6,165,506 A | 12/2000 | Jain et al. |
| RE37,053 E | 2/2001 | Hanes et al. |
| 6,303,148 B1 | 10/2001 | Hennink et al. |
| 6,395,302 B1 | 5/2002 | Hennink et al. |
| 6,406,735 B2 | 6/2002 | Stein et al. |
| 6,497,903 B1 | 12/2002 | Hennink et al. |
| 6,589,557 B2 | 7/2003 | Straub et al. |
| 6,589,562 B1 | 7/2003 | Shefer et al. |
| 6,610,317 B2 | 8/2003 | Straub et al. |
| 6,740,310 B2 | 5/2004 | Edwards et al. |
| 6,740,631 B2 | 5/2004 | Shefer et al. |
| 6,800,297 B2 | 10/2004 | Altreuter et al. |
| 6,835,389 B1 | 12/2004 | Dohi et al. |
| 6,932,983 B1 | 8/2005 | Straub et al. |
| 6,942,868 B2 | 9/2005 | Edwards et al. |
| 6,977,087 B2 | 12/2005 | Edwards et al. |
| 6,998,393 B2 | 2/2006 | Jin et al. |
| 7,018,657 B2 | 3/2006 | Dickinson et al. |
| 7,060,296 B2 | 6/2006 | Hennink et al. |
| 7,078,057 B2 | 7/2006 | Kerkhof |
| 7,300,919 B2 | 11/2007 | Patton |
| 7,323,441 B2 | 1/2008 | Morazzoni et al. |
| 7,378,110 B2 | 5/2008 | Truong-Le et al. |
| 7,404,828 B1 | 7/2008 | Nicola |
| 7,521,069 B2 | 4/2009 | Patton et al. |
| 7,682,635 B2 | 3/2010 | Gref et al. |
| 7,780,988 B2 | 8/2010 | Beyerinck et al. |
| 7,928,089 B2 | 4/2011 | Morton et al. |
| 8,343,550 B2 | 1/2013 | Beyerinck et al. |
| 2002/0146509 A1 | 10/2002 | Kodokian et al. |
| 2003/0104076 A1 | 6/2003 | Berkulin et al. |
| 2003/0124193 A1 | 7/2003 | Snyder et al. |
| 2003/0166509 A1 | 9/2003 | Edwards et al. |
| 2003/0185893 A1* | 10/2003 | Beyerinck et al. ............ 424/489 |
| 2003/0207776 A1 | 11/2003 | Shefer et al. |
| 2003/0215515 A1 | 11/2003 | Truong-Le et al. |
| 2004/0006276 A1 | 1/2004 | Demos et al. |
| 2004/0037905 A1 | 2/2004 | Bringe |
| 2004/0062778 A1 | 4/2004 | Shefer et al. |
| 2004/0076670 A1 | 4/2004 | Klinksiek et al. |
| 2004/0091535 A1 | 5/2004 | Vachon et al. |
| 2004/0092470 A1 | 5/2004 | Leonard et al. |
| 2004/0109894 A1 | 6/2004 | Shefer et al. |
| 2004/0145069 A1 | 7/2004 | Low |
| 2004/0176391 A1 | 9/2004 | Weers et al. |
| 2004/0184995 A1 | 9/2004 | Katsuma et al. |
| 2004/0191186 A1 | 9/2004 | Edwards et al. |
| 2004/0224019 A1 | 11/2004 | Shefer et al. |
| 2004/0234597 A1 | 11/2004 | Shefer et al. |
| 2005/0019270 A1 | 1/2005 | Finlay et al. |
| 2005/0031692 A1 | 2/2005 | Beyerinck et al. |
| 2005/0037996 A1 | 2/2005 | Beck et al. |
| 2005/0058710 A1 | 3/2005 | Straub et al. |
| 2005/0065047 A1 | 3/2005 | Shefer et al. |
| 2005/0112235 A1 | 5/2005 | Shefer et al. |
| 2005/0118208 A1 | 6/2005 | Bewert et al. |
| 2005/0158249 A1 | 7/2005 | Edwards et al. |
| 2005/0191246 A1 | 9/2005 | Bechtold-Peters et al. |
| 2006/0039987 A1 | 2/2006 | Batycky et al. |
| 2006/0068019 A1 | 3/2006 | Dalziel et al. |
| 2006/0093557 A1 | 5/2006 | Dickinson et al. |
| 2006/0121121 A1 | 6/2006 | Jin et al. |
| 2006/0127480 A1 | 6/2006 | Tobyn et al. |
| 2006/0141029 A1 | 6/2006 | Heller et al. |
| 2006/0141047 A1 | 6/2006 | Heller et al. |
| 2006/0142185 A1 | 6/2006 | Morazzoni et al. |
| 2006/0153912 A1 | 7/2006 | Habich et al. |
| 2006/0159625 A1 | 7/2006 | Tarara et al. |
| 2006/0165785 A1 | 7/2006 | Noga et al. |
| 2006/0210640 A1 | 9/2006 | Kerkhof |
| 2006/0257491 A1 | 11/2006 | Morton et al. |
| 2006/0263454 A1 | 11/2006 | Sugiyama et al. |
| 2006/0280691 A1 | 12/2006 | Wang et al. |
| 2006/0292081 A1 | 12/2006 | Morton et al. |
| 2007/0020197 A1 | 1/2007 | Galli et al. |
| 2007/0031490 A1 | 2/2007 | Loebenberg et al. |
| 2007/0042021 A1 | 2/2007 | Schiffrin et al. |
| 2007/0043030 A1 | 2/2007 | Morton et al. |
| 2007/0045100 A1 | 3/2007 | Wright |
| 2007/0134341 A1 | 6/2007 | Kipp et al. |
| 2007/0148236 A1 | 6/2007 | Babcock et al. |
| 2007/0166386 A1 | 7/2007 | Chinea et al. |
| 2007/0189979 A1 | 8/2007 | Zeng et al. |
| 2008/0057003 A1 | 3/2008 | Bechtold-Peters et al. |
| 2008/0124349 A1 | 5/2008 | Engstad et al. |
| 2008/0131514 A1 | 6/2008 | Truong-Le et al. |
| 2008/0181962 A1 | 7/2008 | Brzeczko et al. |
| 2008/0207476 A1 | 8/2008 | Artiga Gonzalez et al. |
| 2008/0229609 A1 | 9/2008 | Bronshtein |
| 2008/0248117 A1 | 10/2008 | Kolter et al. |
| 2008/0292707 A1 | 11/2008 | Babcock et al. |
| 2009/0011031 A1 | 1/2009 | Staniforth et al. |
| 2009/0038612 A1 | 2/2009 | Nilsson et al. |
| 2009/0269411 A1 | 10/2009 | Bellinghausen et al. |
| 2009/0270308 A1 | 10/2009 | Libin et al. |
| 2009/0285905 A1 | 11/2009 | Gordon et al. |
| 2012/0015924 A1 | 1/2012 | Friesen et al. |

FOREIGN PATENT DOCUMENTS

| | | |
|---|---|---|
| EP | 0380219 | 8/1990 |
| EP | 0405598 | 1/1991 |
| EP | 0421581 | 4/1991 |
| EP | 0421582 | 4/1991 |
| EP | 0807431 | 11/1997 |
| EP | 1239844 | 9/2002 |
| EP | 1506996 | 2/2005 |
| EP | 1552815 | 7/2005 |
| EP | 1552817 | 7/2005 |
| EP | 1741424 | 1/2007 |
| EP | 1844758 | 10/2007 |
| GB | 918168 | 2/1963 |
| GB | 1305598 | 2/1973 |
| GB | 2132495 | 7/1984 |
| WO | WO97/44013 | 11/1997 |
| WO | WO98/31346 | 7/1998 |
| WO | WO00/13672 | 3/2000 |
| WO | WO00/72827 | 12/2000 |
| WO | WO01/45674 | 6/2001 |
| WO | WO01/45677 | 6/2001 |
| WO | WO01/78689 | 10/2001 |
| WO | WO01/95877 | 12/2001 |
| WO | WO02/24169 | 3/2002 |
| WO | WO02/45575 | 6/2002 |
| WO | WO02/083154 | 10/2002 |
| WO | WO03/043586 | 5/2003 |
| WO | WO03/092659 | 11/2003 |
| WO | WO03/105780 | 12/2003 |
| WO | WO2004/006897 | 1/2004 |
| WO | WO2004/012690 | 2/2004 |
| WO | WO2004/030659 | 4/2004 |
| WO | WO2004/039960 | 5/2004 |
| WO | WO2004/041991 | 5/2004 |
| WO | WO2004/060351 | 7/2004 |
| WO | WO2004/071521 | 8/2004 |
| WO | WO2004/082660 | 9/2004 |
| WO | WO2004/112695 | 12/2004 |
| WO | WO2004/112696 | 12/2004 |
| WO | WO2005/007080 | 1/2005 |
| WO | WO2005/011636 | 2/2005 |
| WO | WO2005/025541 | 3/2005 |
| WO | WO2005/025550 | 3/2005 |

(56) References Cited

FOREIGN PATENT DOCUMENTS

| WO | WO2005/055976 | | 6/2005 |
|---|---|---|---|
| WO | WO2005/084644 | | 9/2005 |
| WO | WO2005/115330 | | 12/2005 |
| WO | WO2005/117962 | | 12/2005 |
| WO | WO2006/003504 | | 1/2006 |
| WO | WO2006/036617 | | 4/2006 |
| WO | WO2007/027918 | | 3/2007 |
| WO | WO2008/011086 | | 1/2008 |
| WO | WO2008/092057 | | 7/2008 |
| WO | WO2008/101173 | | 8/2008 |
| WO | WO2009/046440 | | 4/2009 |
| WO | WO 2009091416 A2 | * | 7/2009 |
| WO | WO2010/102066 | | 9/2010 |
| WO | WO2010/111132 | | 9/2010 |
| WO | WO2010/132827 | | 11/2010 |

OTHER PUBLICATIONS

International Search Report and Written Opinion issued in PCT/US2010/027930, mailed Feb. 17, 2011, 13 pages.

International Search Report and Written Opinion issued in PCT/US2011/052819, mailed Feb. 17, 2012, 9 pages.

Kawashima et al., "A New Powder Design Method to Improve Inhalation Efficiency of Pranlukast Hydrate Dry Powder Aerosols by Surface Modification with Hydroxypropylmethylcellulose Phthalate Nanospheres," *Pharmaceutical Research*, vol. 15, No. 11, pp. 1748-752 (Nov. 1998).

Rasenack et al., "Micronization of Anti-Inflammatory Drugs for Pulmonary Delivery by a Controlled Crystallization Process," *Journal of Pharmaceutical Sciences*, vol. 92, No. 1, pp. 35-44 (Jan. 2003).

Sham et al., "Formulation and characterization of spray-dried powders containing nanoparticles for aerosol delivery to the lung," *International Journal of Pharmaceutics*, vol. 269, Issue 2, pp. 457-467 (Jan. 2004).

Steckel et al., "In-situ-micronization of disodium cromoglycate for pulmonary delivery," *European Journal of Pharmaceutics and Biopharmaceutics*, vol. 55, No. 2, pp. 173-180 (Mar. 2003).

Steckel et al., "In vitro characterization of jet-milled and in-situ-micronized fluticasone-17-propionate," *International Journal of Pharmaceutics*, vol. 258, Issues 1-2, pp. 65-75 (Jun. 2003).

International Search Report and Written Opinion, dated Feb. 24, 2012 issued in related International Application No. PCT/US2011/050222, 12 pages.

International Search Report and Written Opinion, dated Feb. 17, 2012, issued in related International Application No. PCT/US2011/052819. 9 pages.

Snyder, Herman E., "Streamlining Spray Drying Process Design for Pulmonary Dry Powder Product Development: Application of Computational Fluid Dynamics to Aid System Scale-Up," *Respiratory Drug Delivery*, 2008, pp. 207-215.

US 5,849,884, 12/1998, Woiszwillo et al. (withdrawn)

* cited by examiner

HIGH-TEMPERATURE SPRAY DRYING PROCESS AND APPARATUS

CROSS REFERENCE TO RELATED APPLICATIONS

This is the U.S. National Stage of International Application No. PCT/US2011/052819, filed Sep. 22, 2011, published in English under PCT Article 21(2), which claims the benefit of and priority to U.S. Provisional Patent Application No. 61/386,384 filed on Sep. 24, 2010, each of which is incorporated herein in its entirety by reference.

FIELD

Disclosed herein are embodiments of a high-temperature spray-drying process for making particles from a solution comprising a solute in a solvent, and embodiments of an apparatus for performing the process. In certain embodiments, the apparatus includes a flash nozzle.

BACKGROUND

The use of spray drying to produce powders from fluid feed stocks is well known, with applications ranging from powdered milk to bulk chemicals and pharmaceuticals. See U.S. Pat. No. 4,187,617 and Mujumbar et al., *Drying* 91, pages 56-73 (1991). See also Masters, *Spray Drying Handbook*, pages 263-268 (4th edition, 1985). The use of spray drying to form solid amorphous dispersions of drugs or active agents and concentration-enhancing polymers is also known. See commonly owned U.S. Pat. Nos. 6,763,607 and 6,973,741, which are incorporated herein by reference.

When it is desired to form a spray-dried product in which the drug or active agent is amorphous, it is desirable to have the active agent fully dissolved in the spray solution when it is atomized into droplets. Specifically, when it is desired to form a spray-dried product in which the amorphous active agent is dispersed in one or more excipients, it is generally desired to have at least a part and often all of the excipients also dissolved in the spray solution. In such cases, the throughput of a conventional spray-drying process is often limited by the amount of active agent and excipient that can be dissolved in the spray solution. It is generally known that the solubility of many substances, such as active agents and excipients, often increases as the temperature of the solvent is increased. However, industry avoids using elevated temperatures when using organic solvents, due to the inherent dangers and safety concerns when processing organic solvents, which are often flammable at high temperatures. In addition, conventional spray-drying processes avoid use of elevated temperatures out of concern for the thermal stability of the solute—degradation of the solute (e.g., an active agent and/or an excipient) can lead to unwanted breakdown products in the particles produced.

Because of this, conventional spray-drying solutions are generally kept at or near room temperature when entering the spray nozzle. This limits the throughput of the process due to the often low solubility of the solute(s) in the solvents used. In addition, when the solubility of the solute in the spray solution is low, the solute is often dissolved to near its solubility limit to achieve as high a throughput as possible. The spray-dried products obtained from such solutions are often not homogeneous. Finally, conventional spray-dried processes often produce products that suffer from not being homogeneous because the rate of solvent removal is not sufficiently fast, and broad ranges of particle sizes are produced because the atomization means produces a wide range of droplet sizes.

U.S. Patent Application Publication No. 2008/0248117A1 describes the production of solid solutions containing poorly-soluble active substances using a spray-drying process utilizing short-term heating and rapid drying. The process avoids organic solvents by utilizing a feed stream that is an aqueous suspension of the active. The aqueous suspension is heated to allow dissolution of the active in the spray solution. However, this process is limited to actives that have a high solubility in water at elevated temperature.

What is needed is a spray-drying process that results in improved properties of the spray-dried product, such as a higher degree of homogeneity and more uniform particle size, and that improves the throughput of spray-drying equipment while spraying solutions of a solute, and provides a safe, reproducible process to produce high-quality product. Such a process promises to increase the quality and decrease manufacturing costs for spray-dried products.

SUMMARY

A process for improving the throughput of a spray dryer comprises (a) delivering a spray solution comprising at least one solute in a solvent to a spray-drying apparatus, (b) atomizing the spray solution into droplets within the spray-drying apparatus via a flash nozzle to remove at least a portion of the solvent from the droplets to form a plurality of particles, and (c) collecting the particles. The spray solution is initially at a temperature $T_1$, and is directed to a heat exchanger, thereby increasing the temperature of the spray solution to a temperature $T_2$ prior to atomization, wherein temperature $T_2$ is greater than temperature $T_1$. In one embodiment, temperature $T_2$ is greater than the ambient-pressure boiling point of the solvent.

A flash nozzle having a central tube and an outer tube utilizes a pressure drop that induces cavitation in the spray solution prior to exiting the nozzle orifice to induce droplet formation. Spray solution is delivered through the central tube at a temperature $T_3$, wherein temperature $T_3$ is less than or equal to temperature $T_2$. A sweep gas around the orifice is used to eliminate or reduce solids build-up during operation. In one embodiment, the central tube has a tapered end with an outer diameter that is narrower at its outlet than its inlet to further reduce or eliminate solids build-up during operation.

The solvent can be an organic solvent, an aqueous-based solvent, or any combination thereof. In one embodiment, the spray solution is not a suspension. In another embodiment, the spray solution is a suspension.

In one embodiment, the solute comprises an active agent. In another embodiment, the solute comprises an excipient. In still another embodiment, the solute comprises an active agent and an excipient. In yet another embodiment, the solute comprises an active agent and a polymer.

In still another embodiment, the particles comprise a solid amorphous dispersion of an active agent and a polymer.

The disclosed processes provide one or more advantages over a conventional spray-drying process. Certain embodiments of the disclosed processes can increase the throughput of a spray dryer by forming a spray solution that has a higher concentration at a higher temperature than conventional processes. Operating in this regime generally leads to spray-dried products that are more homogeneous and more uniform. In addition, the disclosed processes result in rapid evaporation of the solvent, and shorter times to solidification than conventional processes. Furthermore, in some embodiments, the process results in improved atomization of the spray solution relative to conventional processes due to the temperature of the spray solution when it is atomized being above the boiling point of the solvent at the pressure of the drying chamber.

BRIEF DESCRIPTION OF THE SEVERAL VIEWS OF THE DRAWINGS

FIG. 1 is a schematic of one embodiment of a spray-drying apparatus suitable for use in performing embodiments of the disclosed spray-drying process.

FIG. 2 is a schematic of another embodiment of a spray-drying apparatus suitable for use in performing embodiments of the disclosed spray-drying process.

FIG. 3 is a schematic of one embodiment of a flash nozzle, suitable for use in performing embodiments of the disclosed spray-drying process.

FIG. 4 is a schematic of another embodiment of a flash nozzle, suitable for use in performing embodiments of the disclosed spray-drying process.

FIG. 5 is a figure showing the results of powder X-ray diffraction of the samples of Example 1, Control 1, and Control 2.

DETAILED DESCRIPTION

A spray-drying process for producing a composition comprising a solute is described. The spray-drying process, suitable apparatus for carrying out the process, and suitable solutes, active agents and excipients are described in detail below.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Spray-Drying Process

The term spray drying is used conventionally and broadly refers to processes involving breaking up liquid mixtures into small droplets (atomization) and rapidly removing solvent from the mixture in a container (drying chamber) where there is a strong driving force for evaporation of solvent from the droplets. The strong driving force for solvent evaporation is generally provided by maintaining the partial pressure of solvent in the spray-drying apparatus well below the vapor pressure of the solvent at the temperature of the drying droplets. This is accomplished by (1) mixing the liquid droplets with a warm drying gas, (2) maintaining the pressure in the spray-drying apparatus at a partial vacuum (e.g., 0.01 atm to 0.50 atm), or (3) both.

Generally, the temperature and flow rate of the drying gas is chosen so that the droplets of spray solution are dry enough by the time they reach the wall of the apparatus that they are essentially solid, form a fine powder, and do not stick to the apparatus wall. The actual length of time to achieve this level of dryness depends on the size of the droplets and the conditions at which the process is operated. Droplet sizes may range from 1 μm to 500 μm in diameter, the size being dependent on the desired particle size of the spray dried powder. The large surface-to-volume ratio of the droplets and the large driving force for evaporation of solvent lead to actual drying times of a few seconds or less, and often less than 0.1 second. Solidification times should be less than 100 seconds, and often less than a few seconds.

Turning to the drawings, wherein the same numerals refer to like elements, there is shown in FIG. 1 one embodiment of an apparatus 10 suitable for performing embodiments of the disclosed processes. In the following discussion it is assumed that the spray-drying apparatus is cylindrical. However, the dryer may take any other cross-sectional shape suitable for spray drying a spray solution, including square, rectangular, and octagonal, among others. The spray-drying apparatus is also depicted as having one nozzle. However, multiple nozzles can be included in the spray-drying apparatus to achieve higher throughput of the spray solution.

The apparatus shown in FIG. 1 includes a feed suspension tank 20, a heat exchanger 30, a drying chamber 40, a nozzle 50, and a particle-collection means 60. In one embodiment, the process is performed as follows. At least one solute is combined with a solvent in the feed suspension tank 20 to form a feed suspension. The feed suspension is at a temperature $T_1$, which is below the ambient-pressure boiling point of the solvent. Temperature $T_1$ is also below $T_S$, the temperature at which the solute solubility equals the solute concentration in the solvent. When the solute comprises more than one solute, temperature $T_1$ is below the temperature at which at least one solute's solubility equals that solute's concentration in the solvent. At least a portion of the solute is suspended, that is not dissolved, in the solvent. An optional mixing means 22 may be used to keep the feed suspension homogeneous while processing. When the solvent is flammable, oxygen is normally excluded from all parts of the drying apparatus. In particular, an inert gas, such as nitrogen, helium, argon, and the like, is often used to fill the void space in the feed suspension tank for safety reasons.

As used herein, the term "feed suspension" means a composition comprising at least one solute and a solvent, wherein at least a portion of the solute is suspended or not dissolved in the solvent. The term "solute" means a material that is desired to be spray dried. In one embodiment, the solute comprises at least one active agent. In another embodiment, the solute comprises at least one excipient. In still another embodiment, the solute comprises a mixture of at least one active agent and at least one excipient.

In one embodiment, the feed suspension comprises an active agent and a solvent. In another embodiment, the feed suspension comprises an excipient and a solvent. In still another embodiment, the feed suspension comprises an active agent, at least one excipient, and a solvent. In one embodiment, the feed suspension consists essentially of an active agent, an excipient, and a solvent. In still another embodiment, the feed suspension consists of an active agent, an excipient, and a solvent. In yet another embodiment, the feed suspension consists of particles of active agent suspended in a solution of an excipient dissolved in the solvent. It will be recognized that in such feed suspensions, a portion of the active agent and the excipient may dissolve up to their solubility limits at the temperature of the feed suspension.

As used herein, the term "solvent" means a compound that can be used to dissolve the at least one solute at elevated temperature. In one embodiment, the solvent is volatile, having an ambient-pressure boiling point of 150° C. or less. In another embodiment, the solvent has an ambient-pressure boiling point of 100° C. or less. Suitable solvents include water, alcohols such as methanol, ethanol, n-propanol, isopropanol, and butanol; ketones such as acetone, methyl ethyl ketone and methyl isobutyl ketone; esters such as ethyl acetate and propyl acetate; and various other solvents, such as tetrahydrofuran, acetonitrile, methylene chloride, toluene, and 1,1,1-trichloroethane. Lower volatility solvents such as dimethylacetamide or dimethylsulfoxide can also be used, generally in combination with a volatile solvent. Mixtures of organic solvents, such as 50% methanol and 50% acetone, can also be used, as can mixtures of organic solvents with water. In one embodiment, the solvent is water. In another embodiment, the solvent contains less than 50 wt % water. In another embodiment, the solvent contains less than 25 wt % water. In still another embodiment, the solvent contains less than 10 wt % water. In yet another embodiment, the solvent contains less than 5 wt % water. In another embodiment, the solvent contains essentially no water.

For convenience, the feed suspension is often maintained at near-ambient temperatures; however, this is not a limitation of the disclosed processes. Generally, the temperature of the feed suspension, $T_1$, can range from 0° C. to 50° C. or even higher. Temperatures of less than 0° C. may also be utilized, especially when there are stability concerns about the solute.

Figure 1:
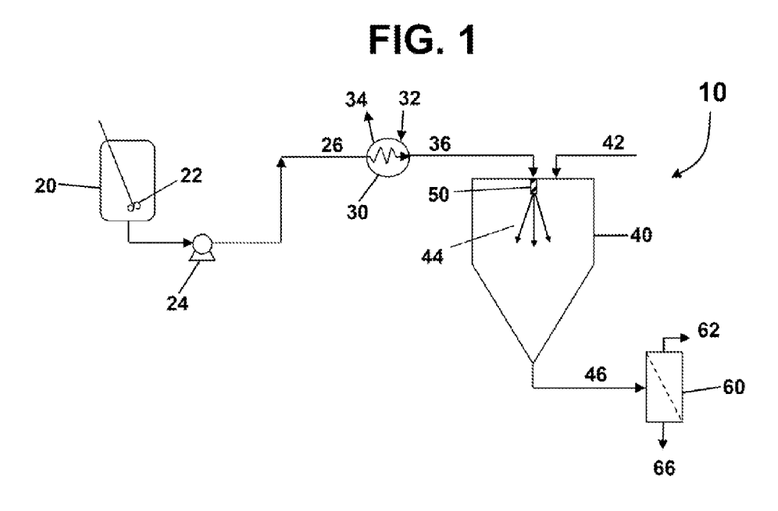

The feed suspension in the feed suspension tank 20 is delivered to a pump 24, which directs the feed suspension to a heat exchanger 30. The heat exchanger has a feed suspension inlet 26, a spray solution outlet 36, a heating fluid inlet 32, and a heating fluid outlet 34. In the heat exchanger 30, the feed suspension enters through the feed suspension inlet 26 at temperature $T_1$, and exits as the spray solution through the spray solution outlet 36 at temperature $T_2$.

As used herein, the term "spray solution" means either a solution comprising at least one solute dissolved in a solvent, or a suspension comprising at least one solute in a solvent, wherein at least a portion of the solute is suspended or not dissolved in the solvent. In one embodiment, a spray solution comprises colloidal materials, dissolved materials, and mixtures thereof. In some embodiments, the spray solution does not comprise a suspension, meaning that the spray solution does not contain crystalline or solid materials having diameters greater than 1000 nm. In this embodiment, the spray solution comprises dissolved materials, colloidal materials, and mixtures thereof. In another embodiment, the spray solution comprises dissolved materials.

Spray solution temperature $T_2$ is greater than feed suspension temperature $T_1$.

In one embodiment, $T_1$ is greater than or equal to $T_S$, the temperature at which the solute solubility equals the solute concentration in the solvent at equilibrium. One of ordinary skill will understand that several factors affect dissolution of a solute in a solvent, including the solute particle size, the flow conditions of the suspension, and the residence time of the solute particles in the solvent at $T_S$. In the following discussion, $T_S$ is the temperature at which the solute concentration in the solvent is equal to the solubility of the solute in the solvent at temperature $T_S$ when at equilibrium (i.e., when the solute concentration has no net change over time). In one embodiment, when $T_1$ is greater than or equal to $T_S$, the solute, at equilibrium, is essentially completely dissolved in the solvent and the spray solution is not a suspension at $T_1$. By "essentially completely dissolved" is meant that less than 5 wt % of the solute remains undissolved. If the solute comprises an active agent and an excipient, $T_1$ is selected such that the active agent is essentially completely dissolved in the solvent at $T_1$, while the excipient may be dissolved, dispersed, or highly swollen in the solvent such that it acts as if it were dissolved. In these embodiments, feed suspension tank 20 is considered to be a spray solution tank 20, and feed suspension inlet 26 is considered to be a spray solution inlet 26.

To prevent unwanted vaporization/boiling of the solvent in the spray solution, pump 24 increases the pressure of the spray solution such that the pressure of the spray solution at spray solution outlet 36 is greater than the vapor pressure of the solvent at temperature $T_2$. The temperature of the spray solution when it enters the nozzle 50 is generally near $T_2$. Preferably it is within 30° C. of temperature $T_2$.

In one embodiment, the spray solution temperature $T_2$ is greater than the ambient-pressure boiling point of the solvent. In one embodiment, $T_2$ is less than $T_S$, and the spray solution is a suspension at $T_2$.

In another embodiment, the spray solution exiting the heat exchanger may be at any temperature, $T_2$, which is greater than $T_1$, as long as $T_2$ is greater than or equal to $T_S$. In one embodiment, when $T_2$ is greater than or equal to $T_S$, the solute is essentially completely dissolved in the solvent, and the spray solution is not a suspension at $T_2$. When it is the object of the process to form a solid amorphous dispersion of an active agent and an excipient, $T_2$ is greater than or equal to the temperature at which the active agent solubility at equilibrium equals the active agent concentration in the solvent (that is, $T_S$). In such an embodiment, $T_2$ preferably is at least 10° C. greater than $T_S$. Temperature $T_2$ may be at least 10° C. greater than $T_1$, at least 20° C. greater than $T_1$, at least 30° C. greater than $T_1$, at least 40° C. greater than $T_1$, or even at least 50° C. greater than $T_1$. In one embodiment, temperature $T_2$ is at least 50° C. In another embodiment, temperature $T_2$ is at least 70° C. In another embodiment, temperature $T_2$ is at least 80° C. In another embodiment, temperature $T_2$ is at least 90° C. In another embodiment, $T_2$ is at least 100° C. In still another embodiment, $T_2$ is at least 120° C.

In one embodiment, the solute is essentially completely dissolved in the solvent at temperature $T_2$. For some excipients, such as polymers, the term dissolved can mean the polymer has gone into solution, or it can mean the polymer is dispersed or highly swollen with the solvent such that it acts as if it were in solution. In contrast, at temperature $T_1$, at least one of the active agent and the excipient may be present as a suspension in the solvent. Any suitable technique may be used to determine if the active agent and excipient are soluble in the solvent at temperature $T_2$. Examples include dynamic or static light scattering analysis, turbidity analysis, and visual observations. In one embodiment, the spray solution comprises the active agent and the excipient dissolved in the solvent at temperature $T_2$.

In one embodiment, temperature $T_2$ is greater than the temperature at which the solute is essentially completely dissolved in the solvent at equilibrium. That is, $T_2$ is greater than or equal to $T_S$. It may be desirable that temperature $T_2$ be much greater than $T_S$. Thus, temperature $T_2$ may be at least 10° C. greater than $T_S$, at least 20° C. greater than $T_S$, or even at least 30° C. greater than $T_S$. Spray-dried products made by embodiments of the disclosed processes are typically more uniform and homogeneous when temperature $T_2$ is greater than $T_S$.

In one embodiment, $T_2$ is greater than $T_1$, and $T_1$ is greater than or equal to $T_S$, such that the spray solution is not a suspension at either $T_1$ or $T_2$. However, the spray solution may be viscous at $T_1$, and increasing the temperature to $T_2$ reduces the viscosity of the spray solution, thereby improving atomization of the spray solution in the spray-drying apparatus.

In one embodiment, the pump 24 increases the pressure of the spray solution to a pressure ranging from 2 atm to 400 atm. In another embodiment, the pressure of the spray solution as it exits the heat exchanger 30 is greater than 10 atm.

The heat exchanger 30 may be of any design wherein heat is transferred to the feed suspension resulting in an increase in temperature. In one embodiment, the heat exchanger 30 is an indirect heat exchanger, wherein a heating fluid is in contact with the feed suspension through a heat-transfer surface. Exemplary indirect heat exchangers include tube-in-tube devices and tube-in-shell devices, both well-known in the art. The heat exchanger 30 may also be a direct heat exchanger, in which a heating fluid, such as steam, is injected directly into the feed suspension, resulting in an increase in the temperature of the feed suspension. In yet another embodiment, the feed suspension flows over a hot surface, such as a resistance heating element, resulting in an increase in temperature of the feed suspension. Other heating sources may also be used, such as microwaves and ultrasonic devices that can increase the temperature of the feed suspension.

The concentration of the at least one solute in the spray solution (that is, the total concentration of dissolved species and suspended species) can be virtually any value. In one embodiment, the concentration of total solids (that is, all dissolved and suspended solutes) in the solvent is at least 0.5 wt %. The concentration of total solids in the solvent may be at least 1 wt %, at least 5 wt %, or even at least 10 wt % or more. In another embodiment, the concentration of the solute in the solvent is at least 1.25-fold the solubility of the solute in the solvent at temperature $T_1$. The concentration of the solute in the solvent may be at least 1.5-fold, at least 2.0-fold, or even 2.5-fold or more the solubility of the solute in the solvent at temperature $T_1$.

In one embodiment, the residence time of the feed suspension in the heat exchanger 30 is minimized so as to limit the time the suspension/solution is exposed to elevated temperatures. The residence time of the suspension/solution in the heat exchanger may be less than 30 minutes, less than 20 minutes, less than 10 minutes, less than 5 minutes, or even less than 1 minute.

The spray solution at the spray solution outlet 36 is directed to a drying chamber 40, where it enters a nozzle 50 for atomizing the spray solution into droplets 44. The temperature of the spray solution when it enters the nozzle 50 is the spray temperature, designated as $T_3$. In one embodiment, $T_3$ is less than or equal to $T_2$. When it is desired to keep the solute essentially completely dissolved in the spray solution (i.e., $T_2$ is greater than $T_S$), it is often desirable for $T_3$ to be at or near $T_2$. However, there are sometimes advantages to having $T_3$ significantly less than $T_2$. For example, degradation of the solute may be reduced or atomization in certain nozzles may be more effective when $T_3$ is significantly less than $T_2$. In some cases, it is even desirable for $T_3$ to be sufficiently low that the solute is not essentially completely dissolved in the solvent. In such cases, the solution may be below the point at which the solutes are essentially completely dissolved for a sufficiently short time such that all the solutes remain dissolved until the solution is atomized. Alternatively, the solution may be below the point at which the solutes are essentially completely dissolved for a sufficiently long time that one or more of the solutes may precipitate or crystallize from solution. In one embodiment, temperature $T_3$ is less than 5° C. less than $T_2$. In another embodiment, temperature $T_3$ is less than 20° C. less than $T_2$. In another embodiment, temperature $T_3$ is less than 50° C. less than $T_2$. In still another embodiment, both temperatures $T_2$ and $T_3$ are greater than $T_S$. In one embodiment, temperatures $T_2$ and $T_3$ are at least 5° C. greater than $T_S$. In another embodiment, temperatures $T_2$ and $T_3$ are at least 20° C. greater than $T_S$. In yet another embodiment, temperatures $T_2$ and $T_3$ are at least 50° C. greater than $T_S$.

In one embodiment, the apparatus 10 is designed such that the time the spray solution is at a temperature greater than $T_3$ is minimized. This may be accomplished by locating the spray solution outlet 36 as close as possible to the nozzle 50. Alternatively, the size of the tubing or fluid connections between the spray solution outlet 36 and the nozzle 50 may be small, minimizing the volume of spray solution and reducing the time the spray solution is at a temperature greater than $T_3$. The time the spray solution is at a temperature greater than $T_3$ may be less than 30 minutes, less than 20 minutes, less than 10 minutes, less than 5 minutes, or even less than 1 minute.

The drying chamber 40 also has a source of heated drying gas 42 which is combined with the droplets 44 in the drying chamber 40. The drying gas may be virtually any gas, but to minimize the risk of fire or explosions due to ignition of flammable vapors, and to minimize undesirable oxidation of the solute, an inert gas such as nitrogen, nitrogen-enriched air, helium, or argon is utilized. The temperature of the heated drying gas at the inlet of the drying chamber is typically from 20° to 300° C.

In the drying chamber 40, at least a portion of the solvent is removed from the droplets to form a plurality of particles comprising the solute. Generally, it is desired that the droplets are sufficiently dry by the time they come in contact with the drying chamber surface that they do not stick or coat the chamber surfaces.

The particles, along with the evaporated solvent and drying gas, exit the drying chamber at outlet 46, and are directed to a particle-collection means 60. Suitable particle-collection means include cyclones, filters, electrostatic particle collectors, and the like. In the particle-collection means 60, the evaporated solvent/drying gas 62 is separated from a plurality of particles 66, allowing for collection of the particles.

The particles may be of any desired size. In one embodiment, the particles have an average diameter ranging from 0.5 μm to 500 μm. In another embodiment, the particles have a diameter ranging from 0.5 μm to 100 μm. In another embodiment, the particles have an average diameter of greater than 10 μm. In still another embodiment, the particles have an average diameter of greater than 20 μm. In still another embodiment, the particles have an average diameter of greater than 30 μm. In yet another embodiment, the particles have a mass median aerodynamic diameter ranging from 0.5 μm to 10 μm. In still another embodiment, the particles have a mass median aerodynamic diameter ranging from 1 μm to 5 μm.

In one embodiment, the plurality of particles produced by the processes and in the apparatuses disclosed herein are inhalable particles that can be inhaled by a subject (e.g., human or animal). As used herein, the term "inhalation" refers to delivery to a subject through the mouth or nose. In one embodiment, the spray-dried particles are delivered to the "upper airways." The term "upper airways" refers to delivery to nasal, oral, pharyngeal, and laryngeal passages, including the nose, mouth, nasopharynx, oropharynx, and larynx. In another embodiment, the spray-dried particles are delivered to the "lower airways." The term "lower airways" refers to delivery to the trachea, bronchi, bronchioles, alveolar ducts, alveolar sacs, and alveoli.

In one embodiment, the particles have a mass median aerodynamic diameter (MMAD) of about 5 to 100 μm. In another embodiment, the particles have a MMAD of about 10 to 70 μm. Mass median aerodynamic diameter (MMAD) is the median aerodynamic diameter based on particle mass. In a sample of particles, 50% of the particles by weight will have an aerodynamic diameter greater than the MMAD, and 50% of the particles by weight will have an aerodynamic diameter smaller than the MMAD. In yet another embodiment, the particles have an average diameter of 50 μm, or even 40 μm, or 30 μm. In other embodiments, the particles can have an MMAD of less than about 20 μm, or even less than about 10 μm. In another embodiment, the particles have a MMAD ranging from 0.5 μm to 10 μm. In still another embodiment, the particles have a MMAD ranging from 1 μm to 5 μm.

In one embodiment, the particles are intended for inhalation and have a MMAD of 0.5 to 100 μm. In another embodiment, the particles are intended for inhalation and have a MMAD of 0.5 to 70 μm.

In one embodiment, the particles are intended for delivery to the upper airways, and have a MMAD of greater than 10 μm. In another embodiment, the particles are intended for delivery to the upper airways and have a MMAD of 10 to 100 μm, and wherein the weight fraction of particles having an aerodynamic diameter of less than 10 μm is less than 0.1. In another embodiment, the particles are intended for delivery to the upper airways and have a MMAD of 10 to 70 μm, and the weight fraction of particles having an aerodynamic diameter of less than 10 μm is less than 0.1.

In another embodiment, the particles are intended for delivery to the lower airways, and have a MMAD of less than 10 μm. In one embodiment, the particles are intended for delivery to the lower airways, and have a MMAD of 0.5 to 10 μm, and the weight fraction of particles having an aerodynamic diameter of greater than 10 μm is less than 0.1. In another embodiment, the particles are intended for delivery to the lower airways, and have a MMAD of 0.5 to 7 μm, and the weight fraction of particles having an aerodynamic diameter of greater than 7 μm is less than 0.1.

In one embodiment, the concentration of solvent remaining in the particles when they are collected (that is, the concentration of residual solvent) is less than 10 wt % based on the total weight of the particles. In another embodiment, the concentration of residual solvent in the particles when they are collected is less than 5 wt %. In yet another embodiment, the concentration of residual solvent in the particles is less than 3 wt %. In another embodiment, a drying process subsequent to the spray-drying process may be used to remove residual solvent from the particles. Exemplary processes include tray drying, fluid-bed drying, vacuum drying, and the drying processes described in WO2006/079921 and WO2008/012617.

Figure 2:
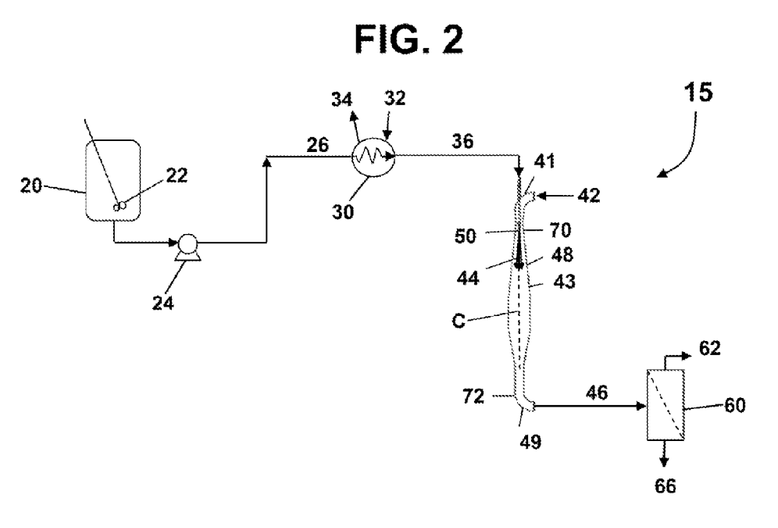

Another embodiment of a spray-drying apparatus 15 suitable for performing embodiments of the disclosed processes is shown in FIG. 2. As shown in FIG. 2, drying chamber 43 has a first end 70 and a second end 72. First end 70 can be an inlet for receiving the nozzle 50 and can be coupled to the drying gas conduit 41 for receiving the drying gas 42. Second end 72 can be an outlet that can be coupled to an exit conduit 49, and then to a particle collection member 60 or other such device to receive and collect the particles as they exit drying chamber 43. The interior volume of drying chamber 43 can be defined by one or more side walls 48 that extend between first and second ends 70, 72. If drying chamber 43 comprises a single integral structure, a single side wall 48 can extend from first end 70 to second end 72. Alternatively, drying chamber 43 can be formed of sections that include multiple side wall sections that are coupled together to form the drying chamber.

In one embodiment, the first end 70 of the drying chamber 43 is located where the spray solution exits the nozzle 50 via one or more outlets in the nozzle 50, while the second end 72 is located where the exit conduit 49 starts.

The spray solution can be delivered to a nozzle 50 via a pump 24 or other delivery device. Nozzle 50 atomizes the spray solution into the drying chamber 43 in the form of droplets 44. A drying gas 42 flows through a drying-gas conduit 41, which is in fluid communication with the first end 70 of drying chamber 43. In one embodiment, the first end 70 of the drying chamber is located at the position where the spray solution exits the nozzle 50. In one embodiment, the drying-gas conduit 41 is configured to allow the drying gas 42 to enter the drying chamber 43 with substantially parallel flow. As used herein, "substantially parallel flow" means that the flow of drying gas 42 entering the drying chamber satisfies at least one of the following two conditions. First, the velocity vector of the drying gas 42 averaged over the cross-section of the first end 70 of the drying chamber 43 is essentially parallel to the center axis C of drying chamber 43 and is substantially in a direction toward a second end 72 of drying chamber 43. As used herein, "essentially parallel" means that the velocity vector averaged over the cross-section of the first end 70 of the drying chamber 43 has a direction that ranges between the center axis C of the drying chamber 43 and the angle formed by the walls 48 of the drying chamber 43 at the first end 70 relative to the center axis C. Second, any circulation cells near the first end 70 of the drying chamber 43 in the vicinity of nozzle 50 are small, with the diameter of the circulation cells being less than 20% of the maximum width between opposing internal surfaces of the interior of the drying chamber 43. In one embodiment, the drying gas entering the drying chamber meets both of these conditions, i.e., the velocity vector of the drying gas 42 is essentially parallel to the center axis C of the drying chamber 43, and any circulation cells in the vicinity of the nozzle 50 are small.

To achieve substantially parallel flow, the drying-gas conduit 41 and first end 70 are generally free from sharp surfaces or protrusions that could disrupt the flow of the drying gas 42. In addition, the walls of the drying gas conduit 41 and the drying chamber 43 are generally parallel to each other where the drying gas conduit 41 is coupled to the drying chamber 43, particularly when it is coupled in the vicinity of the nozzle 50. As used in this context herein, "generally parallel" means that an angle formed between walls of the gas conduit 41 and drying chamber 43 relative to the center axis C of the drying chamber 43 is less than 45° at the first end 70. In one embodiment, the drying-gas conduit 41 contains at least one flow straightener, such as a mesh, screen, or perforated plate that results in substantially parallel flow (as defined above) when the drying gas 42 enters the drying chamber 43. In another embodiment, the drying gas conduit 41 is smooth, having a radius of curvature that is at least twice the width between opposing side walls at the first end 70 of the drying chamber 43.

The drying gas 42 is combined with the droplets 44 in the drying chamber 43. In the drying chamber 43, at least a portion of the solvent is removed from the droplets 44 to form an exiting fluid 46 comprising evaporated solvent/drying gas 62 and a plurality of at least partially dried particles 66. Typically sufficient solvent is removed from the droplets 44 such that the partially dried particles 66 do not stick to the walls of the drying chamber 43. The term "exiting fluid" refers to any fluids, particles, or combinations of fluids and particles that exit the drying chamber 43.

The exiting fluid 46 exits the drying chamber at the second end 72 through exit conduit 49, and can be directed to a particle collection member 60. Suitable particle collection members include cyclones, filters, electrostatic particle collectors, and the like. In the particle collection member 60, the evaporated solvent/drying gas 62 can be separated from the plurality of particles 66, allowing for collection of the particles 66.

Figure 3:
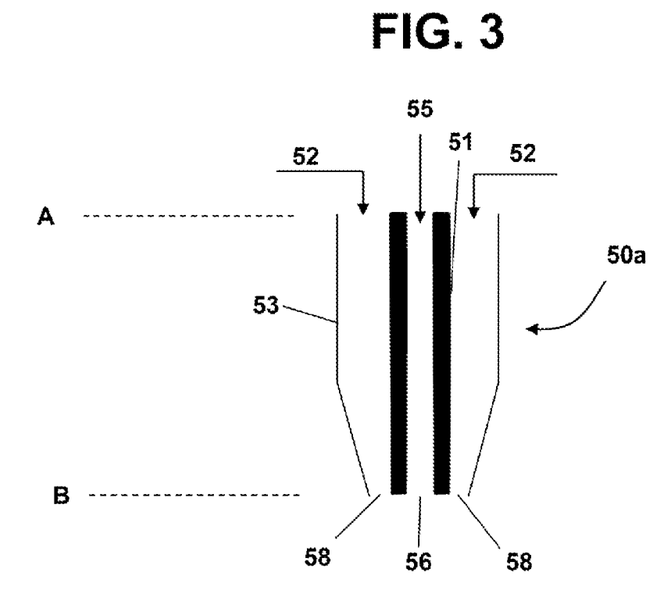

In one embodiment, nozzle 50 is a flash nozzle. There is shown in FIG. 3 a cross-sectional schematic of one embodiment of a flash nozzle 50a. Flash nozzle 50a comprises a central tube 51 and an outer tube 53. Central tube 51 is in fluid communication with an inflowing spray solution 55 comprising at least one solute in a solvent, while outer tube 53 is in fluid communication with a sweep gas 52. The sweep gas may be virtually any gas, but to minimize the risk of fire or explosions due to ignition of flammable vapors, and to minimize undesirable oxidation of the solute, an inert gas such as nitrogen, nitrogen-enriched air, helium, or argon is utilized. In some embodiments, the sweep gas 52 has the same composition as the drying gas 42. In other embodiments, the sweep gas 52 has a different composition than the drying gas 42. The temperature and flow rate of the sweep gas 52 depend, at least in part, on the other operating variables, e.g., $T_3$, spray solution flow rate, etc.

The flash nozzle 50a has an inlet end, represented by A, and an outlet end, represented by B. The spray solution 55 from a heat exchanger (not shown in FIG. 3) enters central tube 51 at A. A sweep gas 52 enters outer tube 53 at A. As spray solution 55 travels through the central tube 51 from inlet A to outlet B, the pressure within central tube 51 decreases due to pressure drop. One of ordinary skill will understand that the pressure drop in the flash nozzle will be a function several factors, including the length of the central tube, the diameter of the central tube, the flow rate of the spray solution, and the viscosity of the spray solution. The pressure of the spray solution when it exits the nozzle as droplets (at outlet B) will be the pressure in the spray drying chamber. Between inlet A and outlet B, the pressure of the spray solution 55 decreases to a value that is less than the vapor pressure of the solvent in the spray solution, leading to the formation of vapor bubbles of the solvent (a process known as cavitation). By the time the spray solution 55 reaches outlet B of the central tube 51, it is a fluid 56 comprising droplets of spray solution and vapor-phase solvent. In one embodiment, the central tube 51 is coated with a non-stick coating. In another embodiment, the outer tube 53 is coated with the non-stick coating. In still another embodiment, the central tube 51 and the outer tube 53 are coated with the non-stick coating. Non-stick coatings include, for example, polytetrafluoroethylene (PTFE) or other suitable non-stick coatings.

The sweep gas 52 exiting through the outer tube outlet 58 is in fluid communication with the fluid 56 exiting through the central tube 51. The sweep gas 52 decreases the likelihood that solid material will form at the exit from the central tube 51 or the outer tube 53.

Figure 4:
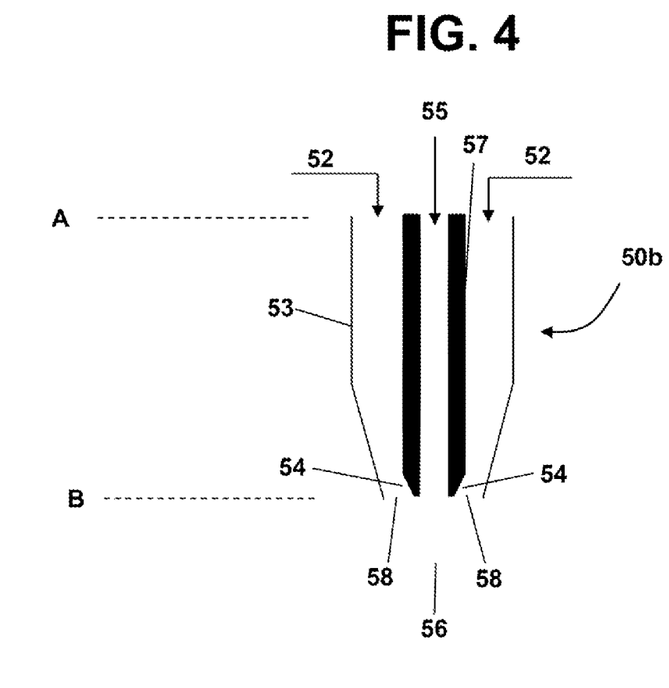

There is shown in FIG. 4 another embodiment of a flash nozzle 50b. Flash nozzle 50b comprises a central tube 57 and an outer tube 53. In one embodiment, the central tube 57 is coated with the non-stick coating. In another embodiment, the outer tube 53 is coated with the non-stick coating. In still another embodiment, the central tube 57 and the outer tube 53 are coated with the non-stick coating. Central tube 57 is in fluid communication with the inflowing spray solution 55, while outer tube 53 is in fluid communication with a sweep gas 52. The sweep gas 52 exiting through the outer tube outlet 58 is in fluid communication with the fluid 56 exiting through the central tube 57. The sweep gas 52 decreases the likelihood that solid material will form at the exit from the central tube 57 or the outer tube 53. Central tube 57 has a tapered end 54 at outlet B to minimize the surface area of the central tube 57 at outlet B. In other words, central tube 57 has a first outer diameter and a first inner diameter at inlet A, and a second outer diameter and a second inner diameter at outlet B. The first outer diameter is greater than the second outer diameter, while the first and second inner diameters are substantially similar. Thus, central tube 57 has a thinner wall at outlet B than at inlet A, thereby having less surface area at its distal end on which solids can deposit and reducing the likelihood that solid material will form at the exit from the central tube 57 or the outer tube 53. In another embodiment, central tube 57 has an inner diameter and an outer diameter, forming a wall thickness of the central tube 57. In one embodiment, the wall thickness of the central tube 57 at inlet A is greater than the wall thickness of the central tube at outlet B. In one embodiment, the inner diameter and outer diameter of central tube 57 are both greater at inlet A than at outlet B.

Flash nozzles 50a, 50b allow spray drying at temperatures greater than the boiling point of the solvent, while minimizing nozzle build-up. Operating at temperatures greater than the boiling point of the solvent leads to two-phase solvent flow as the spray solution 55 travels through central tube 51, 57. When the spray solution 55 enters central tube 51, 57, the pressure is sufficiently high to maintain the solvent in a liquid phase. As the spray solution 55 travels down central tube 51, 57, the pressure drops, leading to cavitation (i.e., boiling). Flash nozzles 50a, 50b are especially advantageous for spray solutions containing film-forming polymers, which are prone to nozzle build-up in conventional nozzles.

Active Agents

In some embodiments of the disclosed spray-drying process, the solute is an active agent. By "active agent" is meant a drug, medicament, pharmaceutical, therapeutic agent, nutraceutical, agrochemical, fertilizer, pesticide, herbicide, nutrient, or other compound that may be desired to be formulated as spray-dried particles. The active agent may be a "small molecule," generally having a molecular weight of 2000 Daltons or less. The active agent may also be a "biological active." Biological actives include proteins, antibodies, antibody fragments, peptides, oligonucleotides, vaccines, and various derivatives of such materials. In one embodiment, the active agent is a small molecule. In another embodiment, the active agent is a biological active. In still another embodiment, the active agent is a mixture of a small molecule and a biological active. In yet another embodiment, the compositions made by certain of the disclosed processes comprise two or more active agents.

The active agent may be highly water soluble, sparingly water soluble, or poorly water soluble. In one embodiment, the active agent is "poorly water soluble," meaning that the active agent has a solubility in water (over the pH range of 6.5 to 7.5 at 25° C.) of less than 5 mg/mL. The active agent may have an even lower aqueous solubility, such as less than about 1 mg/mL, less than about 0.1 mg/mL, and even less than about 0.01 mg/mL.

Excipients

In some embodiments of the disclosed spray-drying process, the solute is an excipient. As used herein, the term "excipient" means a substance that may be beneficial to include in a composition with an active agent. The term "excipient" includes inert substances as well as functional excipients that may result in beneficial properties of the composition. Exemplary excipients include but are not limited to polymers, sugars, salts, buffers, fats, fillers, disintegrating agents, binders, surfactants, high surface area substrates, flavorants, carriers, matrix materials, and so forth. The excipient can be neutral or ionizable. In one embodiment, the composition includes two or more excipients.

Exemplary excipients include polysaccharides. Polysaccharides can be underivatized, such as cellulose, starch, dextran, pullulan, dextrin, maltodextrin, glycogen, inulin, fructan, mannan, chitin, polydextrose, fleximer (a ring-opened form of dextran), and oligosaccharides. Often, derivatives and substituted versions of the polysaccharides are preferred. Examples of such polysaccharide derivatives include ester- and ether-linked derivatives. Included in this class are cellulose ethers, cellulose esters, and cellulose derivatives that have both ester and ether substituents. Specific examples include cellulose acetate, ethyl cellulose, hydroxypropyl methyl cellulose, hydroxyethyl cellulose, hydroxypropyl methylcellulose phthalate, carboxymethyl cellulose, carboxymethyl ethylcellulose, hydroxypropyl methylcellulose acetate succinate, cellulose acetate phthalate and cellulose acetate trimellitate. Starch derivatives include starch acetate and carboxymethyl starch. Also included are synthetic excipients, such as polyacrylates and polymethacrylates, vinyl excipients, polyethylenes, polyoxyethylenes, polypropylenes, polyamides, polyesters, polycarbonates, and derivatives and substituted versions thereof; copolymers of various types, including random and block copolymers; other excipients such as lactose, trehalose, sucrose, fructose, maltose, dextrose, xylitol, sorbitol, glycine, amino acids, citric acid, phospholipids, bile salts; and mixtures thereof.

In one embodiment, the excipient is amphiphilic, meaning that the excipient has hydrophobic and hydrophilic portions. In another embodiment, the excipient is ionizable.

In yet another embodiment, the excipient comprises a polymer. Appropriate polymers include polyvinylpyrrolidone, vinyl acetate/vinylpyrrolidone copolymers, vinyl alcohol, vinyl acetate/vinyl alcohol copolymers, hydroxyethyl cellulose, hydroxypropyl methylcellulose, hydroxypropyl methylcellulose phthalate, carboxymethyl cellulose, carboxymethyl ethylcellulose, hydroxypropyl methylcellulose acetate succinate, cellulose acetate phthalate and cellulose acetate trimellitate. In still another embodiment, the excipient comprises an ionizable cellulosic polymer. In yet another embodiment, the excipient comprises an amphiphilic, ionizable polymer.

In one embodiment, the excipient is biodegradable, meaning that the excipient will degrade over time. By "degrade" is meant that in a use environment, the excipient is broken down into smaller species that can be absorbed, metabolized, or otherwise eliminated or removed from the environment of use. This degradation can occur through enzymatic, hydrolytic, oxidative, or other reaction, as is well known in the art, or by degrading the excipient into aqueous soluble species that can readily be removed from the environment of use.

Compositions

In one embodiment, the composition made by the disclosed processes is in the form of a solid amorphous dispersion of the active agent and the excipient.

In another embodiment, the particles comprise a solid amorphous dispersion of the active agent and excipient consisting essentially of amorphous active agent molecularly dispersed throughout the excipient. In this embodiment, the solid dispersion may be considered a "solid solution" of active agent and excipient. The term "solid solution" includes both thermodynamically stable solid solutions in which the active agent is completely dissolved in the excipient, as well as homogeneous materials consisting of amorphous active agent molecularly dispersed throughout the excipient in amounts greater than the solubility of the active agent in the excipient. A dispersion is considered a "solid solution" when it displays a single glass-transition temperature when analyzed by differential scanning calorimetry (DSC). In one embodiment, the particles have at least one $T_g$ due to the amorphous character of the excipient. In another embodiment, at least 90 wt % of the active agent in the particles is amorphous. In yet another embodiment, the active agent is amorphous and molecularly dispersed in a portion of one or more of the excipients, while the remaining portion of the excipient is present as a separate phase. This separate phase excipient may be amorphous, crystalline, or a mixture of both amorphous and crystalline.

In another embodiment the particles comprise the active agent in crystalline form, which is homogeneously or substantially homogeneously distributed in the excipient. In still another embodiment, the particles comprise the active agent in amorphous or non-crystalline form, which is homogeneously distributed in the excipient matrix. In yet another embodiment, the particles comprise a mixture of active agent in crystalline and amorphous forms homogeneously distributed in the excipient.

In still another embodiment, the particles comprise a mixture of active-agent-rich domains and excipient-rich domains. The active agent in the domains may be amorphous, crystalline, or a mixture of amorphous and crystalline.

In yet another embodiment, the compositions comprise a third component in addition to the active agent and the excipient. This third component may be any compound or mixture of compounds that facilitates the intended use of the disclosed compositions. Exemplary third components include, but are not limited to, matrix materials, surface active agents, wetting agents, diluents, fillers, bulking agents, disintegrants, flavors, fragrances, buffering agents, and/or other components known in the art.

Without further elaboration, it is believed that one of ordinary skill in the art can, using the foregoing description, utilize the present invention to its fullest extent. Therefore, the following specific embodiments are to be construed as merely illustrative and not restrictive of the scope of the invention. Those of ordinary skill in the art will understand that variations of the conditions and processes of the following examples can be used.

EXAMPLES

Active Agent 1 was S-(fluoromethyl) 6α,9-difluoro-11β,17-dihydroxy-16α-methyl-3-oxoandrosta-1,4-diene-17β-carbothioate, 17-propionate, also known as fluticasone propionate, having the structure:

Active Agent 1 has a solubility of 0.4 μg/mL in pH 7.4 buffer, and a Log P value of 3.7. The Tg of amorphous Active Agent 1 was determined by DSC to be 84° C. The room temperature (20° C. to 30° C.) solubility of Active Agent 1 in methanol is 0.3 wt %.

Example 1

A spray-dried dispersion was made using an apparatus similar to that shown in FIG. 1. A feed suspension was prepared by mixing 3 gm of Active Agent 1 and 9 gm of the MG grade of hydroxypropyl methylcellulose acetate succinate (HPMCAS-MG, AQOAT-MG available from Shin Etsu, Tokyo, Japan) with 88 gm of a methanol solvent. The HPMCAS-MG dissolved in the solvent, while the active agent remained in suspension. The feed suspension was maintained at ambient temperature, 20° C. to 30° C., with stirring in a pressure pot to prevent settling of the particles of Active Agent 1. The total solids content of the feed suspension was 12 wt %.

The feed suspension in the pressure pot was pressurized to 245 psig and directed at a rate of 26 gm/min to a tube-in-shell heat exchanger. Heating fluid at 160° C. was circulated in a countercurrent manner through the heat exchanger. The spray solution exiting the heat exchanger was at a temperature, $T_2$, of 120° C., and all of the active agent and HPMCAS-MG were dissolved in the spray solution. The average residence time of the spray solution in the heat exchanger was less than 60 seconds. The total time the spray solution was at a temperature of 120° C. was less than 80 seconds. Thus, the elapsed time from the time the spray solution exited the heat exchanger to the time it exited the pressure nozzle was 20 seconds. The temperature of the solution entering the nozzle was 120° C.

The spray solution was delivered to the spray-drying chamber where it was atomized using a Schlick 2.0 pressure nozzle (Düsen-Schlick GmbH of Untersiemau, Germany). The spray solution was atomized into droplets within the spray-drying chamber, while simultaneously mixing the droplets with a nitrogen drying gas which was introduced to the drying chamber at a temperature of 140° C. and at a flow rate of 520 gm/min, resulting in the formation of solid particles.

The solid particles, along with the evaporated solvent and the drying gas, were directed to a cyclone separator, where the solid particles were collected. The particles were subsequently dried in a vacuum chamber at 0.15 atm for 2 to 3 hours to remove residual methanol from the particles.

The resulting particles had 25 wt % Active Agent 1 in HPMCAS-MG.

Control 1

As a control, a 25 wt % Active Agent 1 in HPMCAS-MG composition was made using a conventional ambient-temperature spray-drying process. For Control 1, a feed solution was formed by dissolving 0.45 gm of Active Agent 1 and 1.35 gm of HPMCAS-MG in 179.7 gm methanol. Both the active agent and the HPMCAS-MG completely dissolved in the methanol at ambient temperature. The total solids content of this solution was 1.0 wt %.

This solution was spray dried using the same apparatus as described for Example 1, except that the heat exchanger was bypassed, such that the spray solution was not heated prior to atomization. All other operating variables were nominally the same as described in Example 1.

Control 2

As a second control, a feed suspension similar to that formed for Example 1 was prepared and then spray dried without heating the spray solution. The feed suspension consisted of 2.25 gm of Active Agent 1, 6.75 gm of HPMCAS-MG, and 66 gm of methanol, resulting in a feed suspension containing 12 wt % solids. Because the feed was a suspension rather than a solution, a two-fluid nozzle was used (manufactured by Spray Systems, Wheaton, Ill.) to avoid clogging.

The feed suspension was spray dried using the same apparatus as described for Example 1, except that the heat exchanger was bypassed, such that the spray solution was not heated prior to atomization, and a two-fluid nozzle was used for atomization of the feed. All other operating variables were nominally the same as described in Example 1.

Analysis of Compositions from Example 1, Control 1, and Control 2

Samples of the compositions of Example 1, Control 1, and Control 2 were analyzed by powder X-ray diffraction using an AXS D8 Advance PXRD measuring device (Bruker, Inc. of Madison, Wis.). Samples (approximately 100 mg) were packed in Lucite sample cups fitted with Si(511) plates as the bottom of the cup to give no background signal. Samples were spun in the φ plane at a rate of 30 rpm to minimize crystal orientation effects. The x-ray source ($KCu_\alpha$, λ=1.54 Å) was operated at a voltage of 45 kV and a current of 40 mA. Data for each sample were collected over a period of 27 minutes in continuous detector scan mode at a scan speed of 1.8 seconds/step and a step size of 0.04°/step. Diffractograms were collected over the 2θ range of 4° to 40°.

Figure 5:
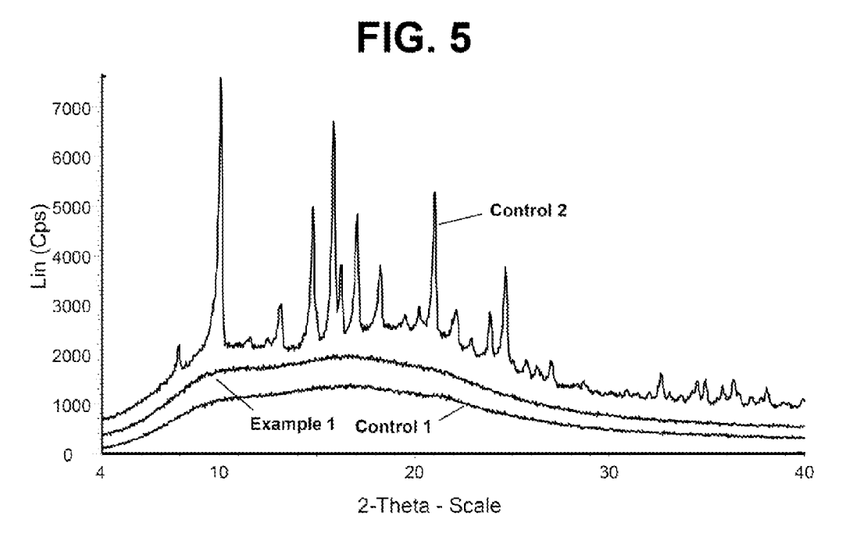

FIG. 5 shows the results of this analysis. The composition of Example 1, made using a concentrated feed suspension and a heat exchanger to increase the feed temperature according to the disclosed processes, showed an amorphous halo, indicating the active agent in the composition was amorphous. Likewise, the composition of Control 1, made using a conventional spray-drying process using a dilute spray solution of active agent and HPMCAS-MG dissolved in a solvent at ambient temperature, also showed only an amorphous halo. However, the composition of Control 2, made using a concentrated feed suspension but not heated, showed a large number of well-defined peaks, indicating the presence of crystalline active agent in the composition.

This analysis shows that the compositions of Example 1 and Control 1 had similar properties. However, because the spray solution for Example 1 contained 12 wt % solids, while the spray solution for Control 1 only contained 1 wt % solids, certain embodiments of the disclosed processes (Example 1) had a throughput that was 12-fold greater than that of the conventional spray-drying process.

Example 2

A spray-dried dispersion is made using an apparatus similar to that shown in FIG. 1 using the procedures outlined in Example 1, except that the flash nozzle of FIG. 3 is used. The resulting particles consist of 25 wt % Active Agent 1 in HPMCAS.

Example 3

A composition was made using an apparatus similar to that shown in FIG. 2. A 5 wt % feed suspension was prepared by mixing 75 g of dextran propionate succinate (prepared by substituting dextran having a starting average molecular weight of 5000 Daltons with propionate and succinate groups, D5PS), with 1425 g of acetone in a feed suspension tank. The feed suspension was maintained at ambient temperature with stirring to prevent settling of the particles. The feed suspension was pumped to a heat exchanger, entering the heat exchanger at ambient temperature, and exiting the heat exchanger at 135° C. as the spray solution.

The spray solution was delivered to a spray drying apparatus similar to that shown in FIG. 2. The spray solution was delivered to the spray dryer at a rate of 39 g/min at a pressure of 735 psig. The spray solution was atomized using a flash nozzle having an inside diameter of 170 µm, an outside diameter of 1588 µm, and a length of 50 mm, inserted into a 0.3-mm diameter tube, similar to the nozzle shown in FIG. 4; nitrogen was flowing through the outer tube at a flow rate such that the nitrogen pressure in the outer tube was 10 psig. Nitrogen drying gas entered the drying chamber at a flow rate of 1630 g/min and an inlet temperature of 67° C. The evaporated solvent and drying gas exited the spray drier at a temperature of 47° C. The resulting composition was collected in a cyclone.

The particles were characterized using a Malvern Particle Size Analyzer, available from Malvern Instruments Ltd. of Framingham, Mass. The mean diameter is reported as D(3,2) (the sum of diameters cubed over the sum of diameters squared). The data obtained includes $D_{10}$, the diameter corresponding to the diameter of particles that make up 10% of the total volume containing particles of equal or smaller diameter, $D_{50}$, and $D_{90}$. Another parameter is "Span," a dimensionless parameter indicative of the uniformity of the particle size distribution, defined as $$\text{Span} = \frac{D_{90} - D_{10}}{D_{50}}$$

Generally, the lower the Span, the more narrow the particle size distribution, resulting in improved flow characteristics. The results of the particle characterization for Example 3 are shown in Table 1. These results show that the composition made using the process of Example 3 formed small particles with a narrow particle size distribution.

Examples 4-6

Examples 4-6 were spray-dried as described in Example 3, with the following exceptions. For Example 4, a flash nozzle was used having an inside diameter of 250 µm, an outside diameter of 1588 µm, and a length of 50 mm, inserted into a 0.3-mm diameter tube; nitrogen was flowing through the outer tube at a flow rate such that the nitrogen pressure in the outer tube was 40 psig. The feed solution flow was 123 g/min at a pressure of 730 psig, and the nitrogen drying gas flow was 1350 g/min at 110° C. The evaporated solvent and drying gas exited the spray drier at a temperature of 48° C.

For Example 5, a flash nozzle was used having an inside diameter of 380 µm, an outside diameter of 1588 µm, and a length of 50 mm, inserted into a 0.3-mm diameter tube; nitrogen was flowing through the outer tube at a flow rate such that the nitrogen pressure in the outer tube was 10 psig. The feed solution flow was 208 g/min at a pressure of 680 psig, and the drying gas nitrogen flow was 1370 g/min at 100° C. The evaporated solvent and drying gas exited the spray drier at a temperature of 46° C.

For Example 6, a 10 wt % spray suspension was made by mixing 30.3 g of D5PS, with 273 g of acetone. The flash nozzle of Example 5 was used, the feed solution flow was 200 g/min at a pressure of 605 psig, and the drying gas nitrogen flow was 1650 g/min at 114° C. The evaporated solvent and drying gas exited the spray drier at a temperature of 47° C.

The results of the particle characterization analysis for Examples 3-6 are shown in Table 1, and show that the process used to form the particles of Examples 3-6 had narrow particle size distributions.

TABLE 1

| | Particle Properties | | | | |
|---|---|---|---|---|---|
| Example | D(3, 2) (µm) | $D_{10}$ (µm) | $D_{50}$ (µm) | $D_{90}$ (µm) | Span |
| 3 | 2.1 | 1.3 | 2.4 | 4.6 | 1.4 |
| 4 | 2.2 | 1.3 | 2.5 | 4.6 | 1.4 |
| 5 | 2.3 | 1.3 | 2.6 | 5.3 | 1.5 |
| 6 | 2.3 | 1.3 | 2.7 | 6.1 | 1.8 |

An embodiment of the disclosed spray-drying processes comprises (a) delivering a spray solution comprising at least one solute in a solvent to a spray-drying apparatus, wherein said spray solution is initially at a temperature $T_1$, and wherein said delivering further comprises directing said spray solution to a heat exchanger to increase the temperature of the spray solution to a temperature $T_2$, wherein temperature $T_2$ is greater than temperature $T_1$, (b) atomizing said spray solution into droplets within said spray-drying apparatus via a flash nozzle to remove at least a portion of said solvent from said droplets to form a plurality of particles wherein said flash nozzle comprises a central tube and an outer tube, and wherein said spray solution is delivered through said central tube at a temperature $T_3$, wherein temperature $T_3$ is less than or equal to temperature $T_2$, and a sweep gas is delivered through said outer tube, and (c) collecting said particles, wherein said particles comprise said at least one solute. In one embodiment, said central tube has a first outer diameter and a first inner diameter at an inlet, and a second outer diameter and a second inner diameter at an outlet, wherein said first outer diameter is greater than said second outer diameter, and wherein said first inner diameter and said second inner diameter are substantially the same.

In one embodiment, said spray solution is not a suspension at temperature $T_1$. In any or all of the above embodiments, said solvent may be selected from water, methanol, ethanol, n-propanol, isopropanol, butanol, acetone, methyl ethyl ketone, methyl isobutyl ketone, ethyl acetate, propyl acetate, tetrahydrofuran, acetonitrile, methylene chloride, toluene, 1,1,1-trichloroethane, and mixtures thereof. In any or all of the above embodiments, said solvent may be aqueous.

In some embodiments, said spray solution is a suspension comprising a solute and a solvent. In one embodiment, said solvent is an aqueous-based solvent. Alternatively, said solvent may be an organic solvent.

In any or all of the above embodiments, said temperature $T_2$ may be greater than the ambient-pressure boiling point of said solvent. In any or all of the above embodiments, said solute may be essentially completely dissolved in said solvent at temperature $T_3$.

In any or all of the above embodiments, said temperature $T_2$ may be at least 100° C. In any or all of the above embodiments, said spray solution may be at temperature $T_2$ for less than 10 minutes. Alternatively, said spray solution may be at temperature $T_2$ for less than 5 minutes.

In any or all of the above embodiments, said particles may have a mass median aerodynamic diameter ranging from 0.5 µm to 10 µm. Alternatively, in any or all of the above embodiments, said particles may have an average diameter of greater than 10 µm.

In any or all of the above embodiments, said at least one solute may comprise an active agent. In any or all of the above embodiments, said solute may comprise an excipient. In some embodiments, when said at least one solute is an active agent, said particles may comprise a solid amorphous dispersion of said active agent in a polymer.

Also disclosed are embodiments of products made by any or all of the above processes. In some embodiments, said product comprises a plurality of particles comprising said solute, wherein said solute is an active agent having a solubility in water at 25° C. of less than 5 mg/mL.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A spray-drying process, comprising:
   (a) delivering a spray solution comprising at least one solute in a solvent from a feed tank to a spray-drying apparatus, wherein said spray solution is initially at a temperature $T_1$, and wherein said delivering further comprises directing said spray solution from the feed tank through a heat exchanger to increase the temperature of the spray solution from the temperature $T_1$ to a temperature $T_2$, wherein the temperature $T_2$ is greater than the temperature $T_1$ and the temperature $T_2$ is greater than the ambient-pressure boiling point of the solvent;
   (b) atomizing said spray solution into droplets within said spray-drying apparatus via a flash nozzle to remove at least a portion of said solvent from said droplets to form a plurality of particles, wherein said flash nozzle comprises a central tube and an outer tube, and wherein said spray solution is delivered through said central tube at a temperature $T_3$, wherein the temperature $T_3$ is less than or equal to the temperature $T_2$, and a sweep gas is delivered through said outer tube; and
   (c) collecting said particles, wherein said particles comprise said at least one solute.

2. The process of claim 1, wherein said central tube has a first outer diameter and a first inner diameter at an inlet, and a second outer diameter and a second inner diameter at an outlet, wherein said first outer diameter is greater than said second outer diameter, and wherein said first inner diameter and said second inner diameter are substantially the same.

3. The process of claim 1, wherein said spray solution does not comprise a suspension at temperature $T_1$.

4. The process of claim 1, wherein said solvent is selected from water, methanol, ethanol, n-propanol, isopropanol, butanol, acetone, methyl ethyl ketone, methyl isobutyl ketone, ethyl acetate, propyl acetate, tetrahydrofuran, acetonitrile, methylene chloride, toluene, 1,1,1-trichloroethane, and mixtures thereof.

5. The process of claim 1, wherein said solvent is aqueous.

6. The process of claim 1, wherein said spray solution is a suspension comprising a solute and a solvent.

7. The process of claim 6, wherein said solvent is an aqueous-based solvent.

8. The process of claim 1, wherein said solvent is an organic solvent.

9. The process of claim 1, wherein said temperature $T_2$ is at least 100° C.

10. The process of claim 1, wherein said spray solution is at the temperature $T_2$ for less than 10 minutes.

11. The process of claim 1, wherein said spray solution is at the temperature $T_2$ for less than 5 minutes.

12. The process of claim 1, wherein said at least one solute comprises an active agent.

13. The process of claim 12, wherein said particles comprise a solid amorphous dispersion of said active agent in a polymer.

14. The process of claim 1, wherein said at least one solute comprises an excipient.

15. The product made by the process of claim 1, wherein said product comprises a plurality of particles comprising said solute, wherein said solute is an active agent having a solubility in water at 25° C. of less than 5 mg/mL.

* * * * *